(12) United States Patent
Sakai et al.

(10) Patent No.: US 8,468,238 B2
(45) Date of Patent: Jun. 18, 2013

(54) COMPUTER PRODUCT, APPARATUS AND METHOD FOR GENERATING CONFIGURATION-INFORMATION FOR USE IN MONITORING INFORMATION TECHNOLOGY SERVICES

(75) Inventors: Kazuyuki Sakai, Kawasaki (JP); Akira Ide, Kawasaki (JP); Yasushi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 12/512,822

(22) Filed: Jul. 30, 2009

(65) Prior Publication Data
US 2010/0115088 A1    May 6, 2010

(30) Foreign Application Priority Data

Oct. 31, 2008    (JP) .................................. 2008-282477

(51) Int. Cl.
*G06F 15/16* (2006.01)
*G06F 12/00* (2006.01)
(52) U.S. Cl.
USPC ......................................... 709/224; 709/250
(58) Field of Classification Search
USPC ......................................... 709/223–229, 250
See application file for complete search history.

(56) References Cited

U.S. PATENT DOCUMENTS

| | | | | |
|---|---|---|---|---|
| 6,317,786 B1* | 11/2001 | Yamane et al. | ................ | 709/224 |
| 7,693,983 B1* | 4/2010 | Gupta et al. | ................... | 709/224 |
| 2004/0010588 A1* | 1/2004 | Slater et al. | .................... | 709/224 |
| 2006/0045039 A1* | 3/2006 | Tsuneya et al. | ................ | 370/318 |
| 2007/0118630 A1* | 5/2007 | Hashimoto et al. | ........... | 709/223 |

FOREIGN PATENT DOCUMENTS

JP    A 2000-3347    1/2000

* cited by examiner

*Primary Examiner* — Zarni Maung
(74) *Attorney, Agent, or Firm* — Greer, Burns & Crain, Ltd.

(57) ABSTRACT

Computer product for generating configuration-information that performs obtaining a first process information operating on a server from each of a plurality of servers constituting an IT system prior to a start of processes in any of the servers, the processes including a process corresponding to an application for an IT service; repeatedly obtaining a second process information from each of the servers through the start to end of the processes performing the application; specifying third process information corresponding to the application by removing the first process information from the second process information; and generating configuration information for monitoring a process condition of the processes, from the third process information, a process name corresponding to the application and identification information of the server where the process corresponds to the process name of the application, the extracted process name being associated with the identification information.

6 Claims, 18 Drawing Sheets

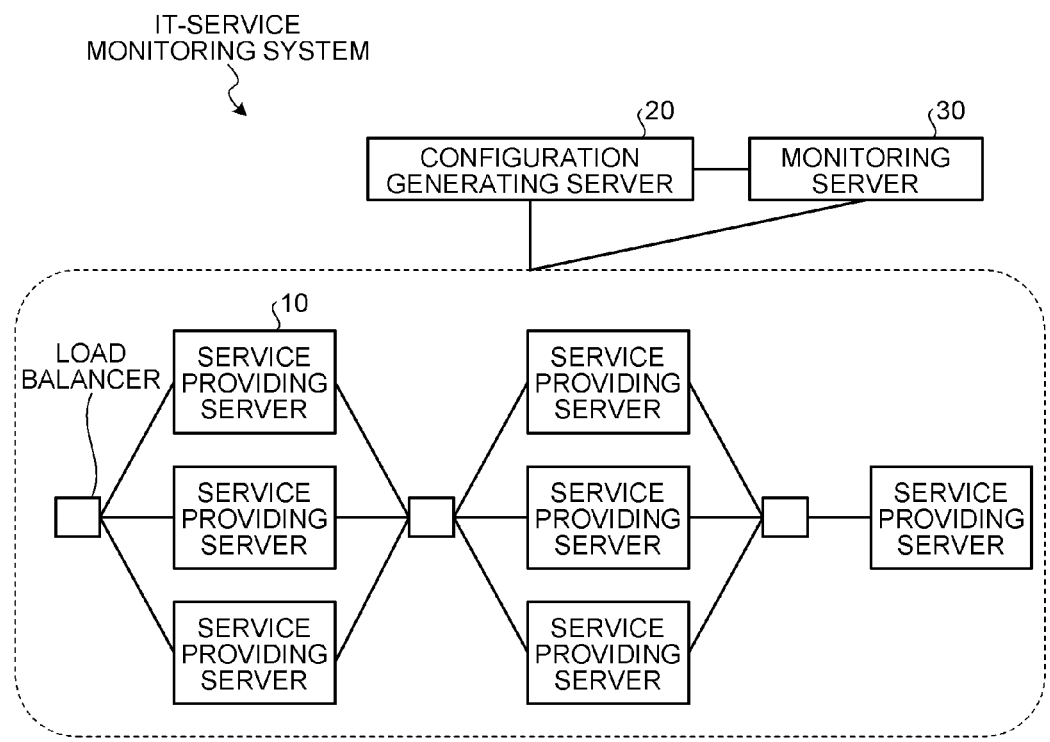

| LOGIC SERVER CI | | |
|---|---|---|
| CI-ID | SERVER NAME | IP ADDRESS |
| 1000 | Web1 | 192.168.1.2 |

FIG.5

| | PROCESS INFORMATION CI IMMEDIATELY AFTER APPLICATION INTRODUCTION | | |
|---|---|---|---|
| CI-ID | PROCESS NAME | CPU UTILIZATION RATE | AMOUNT OF MEMORY USAGE |
| 2000 | ProcA | 5 % | 80 KB |
| | ProcC | 0 % | 200 KB |
| | ProcE | 0 % | 50 KB |
| | ProcF | 0 % | 150 KB |
| | : | : | : |

FIG.6

| | PROCESS INFORMATION CI | | | |
|---|---|---|---|---|
| CI-ID | PROCESS NAME | PROCESS ID | CPU UTILIZATION RATE | AMOUNT OF MEMORY USAGE |
| 3000 | ProcA | 100 | 10 % | 100 KB |
| | ProcB | 101 | 20 % | 120 KB |
| | ProcC | 102 | 0 % | 200 KB |
| | ProcD | 103 | 40 % | 180 KB |
| | ProcE | 104 | 0 % | 50 KB |
| | ProcF | 105 | 0 % | 150 KB |
| | : | : | : | : |

FIG.7

| | DIFFERENTIAL PROCESS INFORMATION CI | | | | |
|---|---|---|---|---|---|
| CI-ID | PROCESS NAME | PROCESS ID | CHANGE IN CPU UTILIZATION RATE | CHANGE IN AMOUNT OF MEMORY USAGE | OCCUR-RENCE |
| 4000 | ProcA | 100 | 5 % | 20 KB | × |
| | ProcB | 101 | - | - | ○ |
| | ProcD | 103 | - | - | ○ |

FIG.8

| | DIFFERENTIAL MERGE CI FOR EACH SERVER | | | | |
|---|---|---|---|---|---|
| CI-ID | PROCESS NAME | PROCESS ID | CHANGE IN CPU UTILIZATION RATE (MAXIMUM VALUE) | CHANGE IN AMOUNT OF MEMORY USAGE (MAXIMUM VALUE) | OCCUR-RENCE |
| 6000 | ProcA | 100 | 5 % | 20 KB | × |
| | ProcB | 101 | - | - | ○ |
| | ProcD | 103 | - | - | ○ |

FIG.13

| NETWORK-DEVICE INFORMATION CI ||||||
|---|---|---|---|---|---|---|
| CI-ID | NAME | IP ADDRESS | VIRTUAL IP ADDRESS | DISTRIBUTION DESTINATION 1 | DISTRIBUTION DESTINATION 2 | DISTRIBUTION DESTINATION 3 |
| 12000 | LB2 | 192.168.1.20 | 192.168.1.11 | 192.168.1.5 | 192.168.1.6 | 192.168.1.7 |

FIG.14

| TRANSACTION INFORMATION CI |||
|---|---|---|
| CI-ID | AT START OF TRANSACTION | AT END OF TRANSACTION |
| 11000 | 2008/7/14 19:34 | 2008/7/14 19:35 |

FIG.15

| IT SERVICE CI ||
|---|---|
| CI-ID | IT SERVICE NAME |
| 11000 | TASK A |

FIG.16

| NETWORK INFORMATION CI ||||||||
|---|---|---|---|---|---|---|---|
| CI-ID | PROCESS ID | LOCAL HOST | LOCAL-HOST PORT NUMBER | CONNECTION-DESTINATION HOST | CONNECTION-DESTINATION-HOST PORT NUMBER | PROTO-COL | STATUS |
| 5000 | 100 | Web1 | 4000 | LB2 | 2000 | Tcp | ESTABLISHED |
|  | 105 | Web1 | 4001 | LB2 | 3000 | Tcp | ESTABLISHED |
|  | : | : | : | : | : | : | : |

FIG.17

| RELATION OBJECT CI | | |
|---|---|---|
| CI-ID | OBJECT-A ID | OBJECT-B ID |
| 7000 | 4000 | 4001 |

FIG.18

| PROCESS-INFORMATION MERGE CI | | |
|---|---|---|
| CI-ID | PROCESS NAME | PROCESS ID |
| 8000 | ProcA | 100 |
| | ProcB | 101 |
| | ProcC | 102 |
| | ProcD | 103 |
| | ProcE | 104 |
| | ProcF | 105 |
| | : | : |

FIG.19

| INTEGRATION RESULT CI | | | |
|---|---|---|---|
| CI-ID | NUMBER OF TIMES OF INTEGRATION | PROCESS NAME | NUMBER OF TIMES OF OCCURRENCE |
| 8000 | 6 | ProcA | 6 |
| | | ProcB | 6 |
| | | ProcD | 6 |
| | | ProcG | 1 |

COMPUTER PRODUCT, APPARATUS AND METHOD FOR GENERATING CONFIGURATION-INFORMATION FOR USE IN MONITORING INFORMATION TECHNOLOGY SERVICES

CROSS-REFERENCE TO RELATED APPLICATION

This application is based upon and claims the benefit of priority of the prior Japanese Patent Application No. 2008-282477, filed on Oct. 31, 2008, the entire contents of which are incorporated herein by reference.

FIELD

The embodiments discussed herein are directed to configuration-information generating programs, configuration-information generating apparatuses, and configuration-information generating methods of generating configuration information for use in monitoring Information Technology (IT) services, and monitoring programs of monitoring the operating condition of a server that provides an IT service by using configuration information.

BACKGROUND

Conventionally, in an IT system formed of a plurality of servers connected in a mutually-communicable state (for example, refer to Japanese Laid-open Patent Publication No. 2000-3347), a system administrator, who is an administrator for the IT system, uses an application introduced on any of the servers to provide an IT service to users.

To monitor the operating condition of the server that provides the IT service, a monitoring console (program) is introduced to a monitoring server connected in a communicable state to each server configuring the IT system. This monitoring server accepts the configuration information of the IT system from the system administrator server, the configuration information associating identification information of the server to which the application is introduced and process identification information of a process corresponding to the application with each other. The monitoring server then monitors whether every process corresponding to each piece of process identification information in the configuration information has been operated during a series of processes including the process corresponding to the application, and then outputs the monitoring result to the system administrator.

Meanwhile, in the conventional monitoring server, an input of the configuration information has to be accepted to monitor the operating condition of the server that provides an IT service. Therefore, if the system administrator cannot input the configuration information, a problem occurs in which the operating condition of the IT service cannot be automatically monitored.

SUMMARY

According to an aspect of the invention, a configuration-information generating apparatus includes a pre-process process-information obtaining unit that obtains process information about a process operating on the server from each of a plurality of servers constituting an IT system, prior to the start of a series of processes in any of the servers, the processes including a process corresponding to an application for providing an IT service; an in-process process-information obtaining unit that repeatedly obtains the process information from each of the servers between the start and end of performing the series of processes including the process corresponding to the application; a process-information specifying unit that specifies process information while the series of processes including the process corresponding to the application is being performed, by removing, from out of the process information obtained between the start and end of performing the series of processes, process information corresponding to the process information obtained prior to the start of the series of processes; and a configuration-information generating unit that generates configuration information for monitoring a process condition of the series of processes including the process corresponding to the application by extracting, from the specified process information, a process name corresponding to the application and identification information of a server where the process corresponding to the application is performed with the extracted process name being associated with identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1D are diagrams for explaining a general outline of a process of generating configuration information in a service monitoring system according to a first embodiment;

FIG. 2 is a block diagram of the configuration of an IT-service monitoring system;

FIG. 5 is a diagram for explaining a process by a performance manager;

FIG. 6 is a diagram for explaining a process by the performance manager;

FIG. 7 is a diagram for explaining a process by the performance manager;

FIG. 8 is a diagram for explaining a process by a monitoring manager;

FIG. 13 is a diagram for explaining a process by the asset manager;

FIG. 14 is a diagram for explaining a process by a network manager;

FIG. 15 is a diagram for explaining a process by the network manager;

FIG. 16 is a diagram for explaining a process by the network manager;

FIGS. 17 to 20 are diagrams for explaining a process by a monitoring manager;

DESCRIPTION OF EMBODIMENTS

Figures 3, 4:
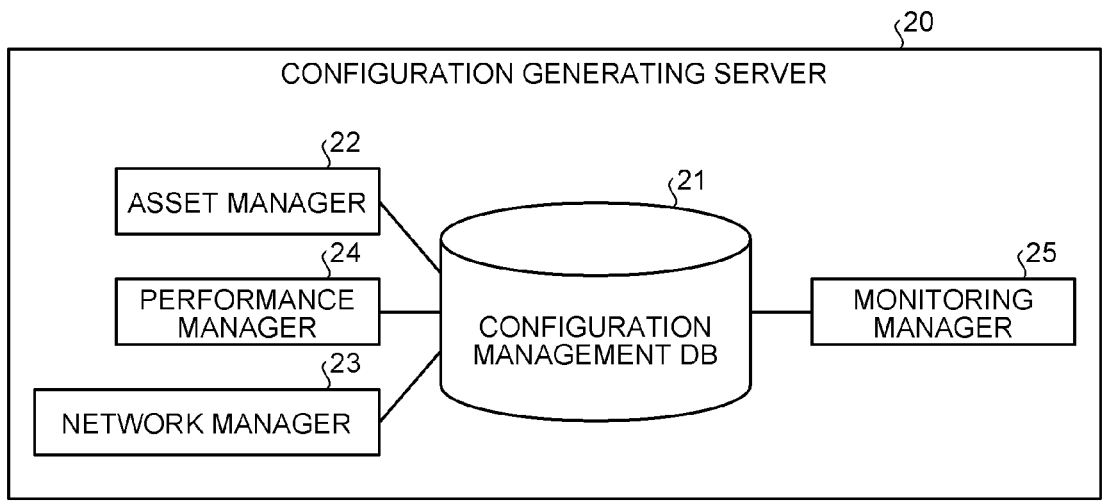
FIG. 3 is a block diagram of the configuration of a configuration generating server.
FIG. 4 is a diagram for explaining a process by an asset manager.

Preferred embodiments of the present invention will be explained with reference to accompanying drawings. In the following, a service monitoring system including a configuration generating server that generates configuration information for IT-service monitoring is exemplarily explained.

[a] First Embodiment

[General Outline of the Service Monitoring System According to the First Embodiment]

FIGS. 1A to 1D are diagrams for explaining a general outline of a process of generating configuration information in a service monitoring system according to a first embodiment. The service monitoring system according to the first embodiment includes a plurality of service providing servers for providing an IT service, a configuration generating server that connected to each service providing server in a communicable state, and a monitoring server connected to each service providing server and the configuration generation server. In summary, the service monitoring system according to the first embodiment monitors the operating condition of the service providing servers and, in particular, automatically generates configuration information and monitors the operating condition of the IT service.

That is, a system administrator introduces to any of the service providing servers an application for providing an IT service. Here, as depicted in FIG. 1A, the configuration generating server obtains, from each service providing server, process information about a process operating on the server before a series of processes including a process corresponding to the application for providing an IT service is started in any of the servers configuring the IT system.

Subsequently, upon accepting a service request from a user, the service providing server having the application introduced thereto performs the series of processes including the process corresponding to the application. Here, as depicted in FIG. 1B, the configuration generating server obtains process information from each of a plurality of service providing servers over a plurality of number of times from the start to end of performing the series of processes including the process corresponding to the application.

When the IT service is provided from the service providing server to the user, the configuration generating server removes, from out of the process information obtained from the start to end of performing the series of processes, process information corresponding to the process information obtained before the series of processes is started. Then, as depicted in FIG. 1C, the configuration generating server specifies process information while the series of processes including the process corresponding to the application is being performed.

Next, from the specified process information, the configuration generating server extracts a process name corresponding to the application and identification information of a service providing server where the process corresponding to the application is performed. The configuration generating server then ties the extracted process name and identification information together, thereby generating configuration information for monitoring the process condition of the series of processes including the process corresponding to the application, as depicted in FIG. 1D.

Thereafter, when the series of processes is performed by the service providing servers, the monitoring server monitors whether every process corresponding to each piece of process identification information in the configuration information has been operated during the series of processes, and outputs the monitoring result to the system administrator.

From those explained above, the service monitoring system according to the first embodiment can automatically generate configuration information and monitor the operating condition of the IT service.

[Configuration of the IT-Service Monitoring System]

FIG. 2 is a block diagram of the configuration of an IT-service monitoring system. FIG. 3 is a block diagram of the configuration of a configuration generating server. FIG. 4 is a diagram for explaining a process by an asset manager. FIGS. 5, 6, and 7 are diagrams for explaining a process by a performance manager. FIG. 8 is a diagram for explaining a process by a monitoring manager.

As depicted in FIG. 2, the IT-service monitoring system has a plurality of service providing servers 10 connected to each other in a mutually connectable state via load balancers, a configuration generating server 20, and a monitoring server 30.

Among these components, the service providing servers 10 correspond to various servers, such as a Web server, application server, and database server, and operate an Operating System (OS) on hardware and an application on the OS.

The configuration generating server 20 generates configuration information for use in IT-service monitoring. In particular, as depicted in FIG. 3, the configuration generating server 20 includes a configuration management database (DB) 21, an asset manager 22, a network manager 23, a performance manager 24, and a monitoring manager 25. Note that the performance manager 24 is also referred to as a pre-process process-information obtaining unit or in-process process-information obtaining unit. Also, the monitoring manager 25 is also referred to as a process-information specifying unit or configuration-information generating unit.

The configuration management DB 21 has stored therein data and programs required for various processes by the performance manager 24 and the monitoring manager 25. Note that a Configuration Item ID (CI-ID) used below indicates information for uniquely identifying information stored in the configuration management DB 21, and a new CI-ID is provided whenever information is stored in the configuration management DB 21.

The asset manager 22 collects, from each service providing server 10, server identification information uniquely provided to the service providing server 10. Specifically, when an application for providing an IT service is introduced to any of the service providing servers 10, the asset manager 22 collets server information (for example, a server name and Internet Protocol (IP) address) for each service providing server 10. Then, as depicted in FIG. 4, the asset manager 22 provides a CI-ID to the collected server information for storage in the configuration management DB 21 as a logic server CI.

The network manager 23 detects the start and end of a transaction process for providing the IT service at each service providing server 10.

The performance manager 24 obtains, from each service providing server 10, process information about a process operating on the server before a series of processes including a process corresponding to an application for providing an IT service is started in any of the service providing servers 10 configuring an IT system. Specifically, when an application for providing an IT service is introduced to any of the service providing servers 10, the performance manager 24 collects process information from each service providing server 10. Here, the process information has a process name of a process operating on each service providing server 10, a CPU use rate, and an amount of memory usage associated with each other. Then, as depicted in FIG. 5, the performance manager 24 provides a CI-ID to the collected process information, and ties as a process information CI immediately after application introduction to a logic server CI of the corresponding service providing server 10 for storage in the configuration management DB 21.

Also, the performance manager 24 obtains process information from each service providing server 10 over a plurality of number of times from start to end of performing the series of processes including the process corresponding to the application for providing the IT service. Specifically, the performance manager 24 collects process information from each service providing server 10 immediately after the start of a transaction process and at the end of the transaction process. Also, until the end of the transaction process, whenever a preset time elapses, the performance manager 24 collects process information from each service providing server 10.

Then, as depicted in FIG. 6, whenever collecting process information, the performance manager 24 provides a CI-ID to the process information, and ties as one process information CI to the logic server CI of the corresponding service providing server 10 for storage in the configuration management DB 21. Note that a process ID depicted in FIG. 6 is to identify a process name, and is provided by the performance manager 24 to each process name.

Also, the performance manager 24 removes, from out of all pieces of process information collected while the transaction process is being performed, information corresponding to the process information collected before the transaction process is started. Then, the performance manager 24 specifies process information while the series of processes including the process corresponding to the application for providing the IT service is being performed.

Specifically, when the transaction process ends, the performance manager 24 reads process information corresponding to the same service providing server 10 and process information immediately after application introduction from the configuration management DB 21. The performance manager 24 then extracts, as process information while the transaction process is being performed, differential process information obtained by subtracting process information corresponding to the process information CI immediately after application introduction from the process information corresponding to the process information CI. Then, as depicted in FIG. 7, the performance manager 24 provides a CI-ID to the extracted differential process information, and ties as a differential process information CI, to the logic server CI of the corresponding service providing server 10 for storage in the configuration management DB 21.

For example, among the process names listed in the process information CI, the performance manager 24 provides an occurrence "○" to a process name not listed in the process information CI immediately after application introduction, for storage in the configuration management DB 21. Also, the performance manager 24 provides an occurrence "x" to a process name whose CPU utilization rate or amount of memory usage has a change upon start of the transaction, and stores the amount of change in the CPU utilization rate and the amount of change in the amount of memory usage in the configuration management DB 21 in association with each other.

The monitoring manager 25 extracts a process name corresponding to the application and identification information of a server in which the process corresponding to the application has been performed from among the differential process information between the process information obtained from the start to end of performing the transaction process and the process information obtained before the series of processes is started. The monitoring manager 25 then ties the extracted process name and the identification information together to generate configuration information for use in IT-service monitoring.

Specifically, the monitoring manager 25 merges the differential process information corresponding to the same logic server CI. Then, as depicted in FIG. 8, the monitoring manager 25 stores the merge result in the configuration management DB 21 as a differential merge CI for each server in association with the logic server CI of the corresponding service providing server 10. For example, the monitoring manager 25 lists all process names in the differential process information for storage in the configuration management DB 21, with their amount of change in CPU utilization rate, amount of change in amount of memory usage, and occurrence "○ (or x)" associated with each other. Here, as the amount of change in CPU utilization rate and the amount of change in amount of memory usage, their maximum values in the differential process information are stored.

The monitoring manager 25 then generates configuration information of the IT system, with the process name (process identification information) in the differential merge CI for each server and the server name (server identification information) in the logic server CI associated with the differential merge CI for each server associated with each other, and then outputs the generated configuration information to the monitoring server 30.

When a transaction process is performed by any of the service providing servers 10, the monitoring server 30 monitors whether all processes with the process names in the configuration information have been operated during the transaction process, and then outputs the monitoring result to the system administrator.

[Process of the IT-Service Monitoring System]

Figure 9:
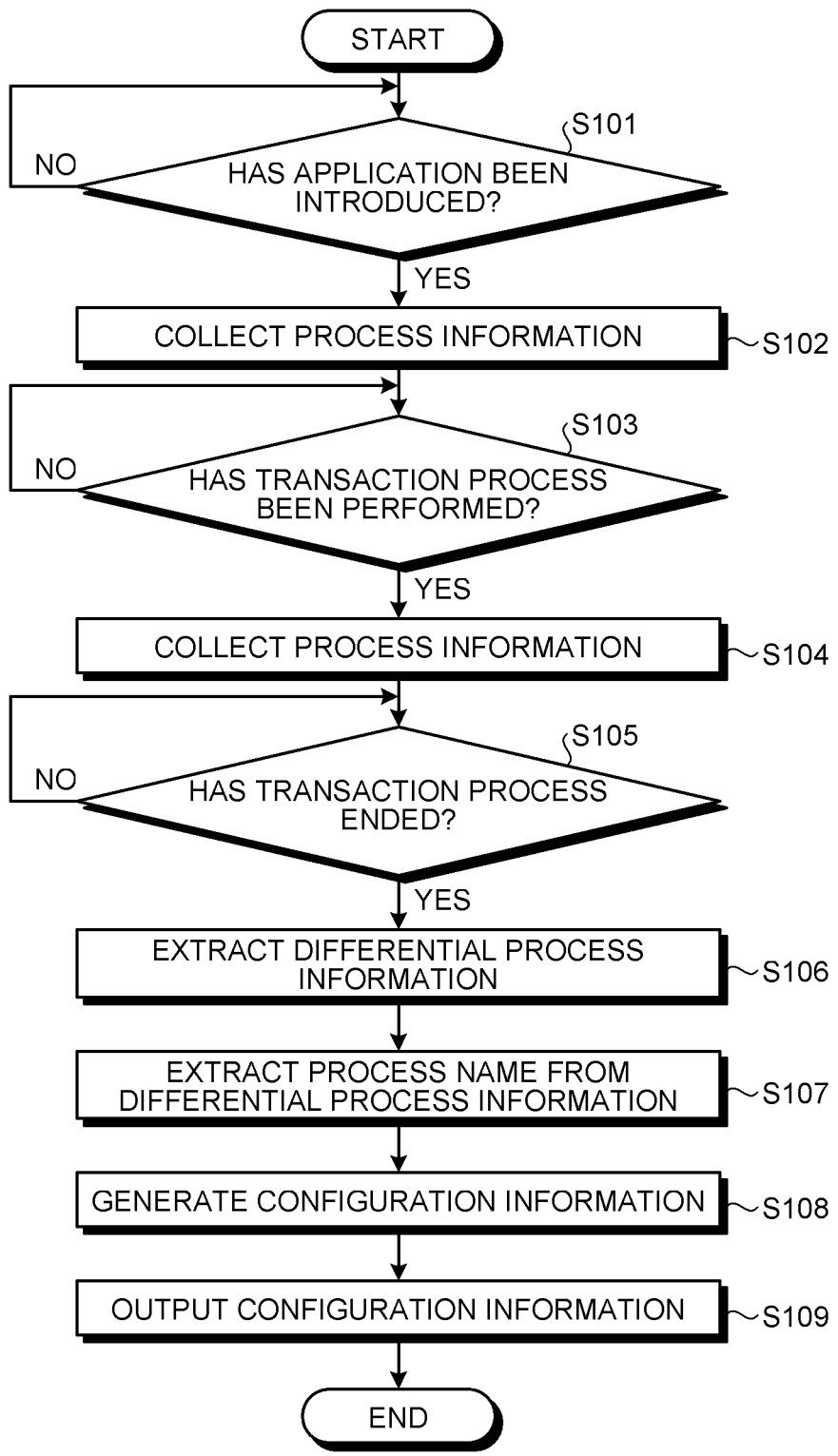
FIG. 9 is a flowchart of a process flow by the configuration generating server.

FIG. 9 is a flowchart of a process flow by the configuration generating server. In the following, a process flow of the configuration generating server 20 is explained from the time immediately after an application is introduced by the system administrator to any of the service providing servers 10 until configuration information is output to the monitoring server 30.

As depicted in FIG. 9, when an application is introduced to any of the service providing servers 10 (Yes at Step S101), the performance manager 24 collects process information from each service providing server 10 (Step S102).

Thereafter, when the network manager 23 detects the start of a transaction process (Yes at Step S103), the performance manager 24 collects process information from each service providing server 10 (Step S104).

Thereafter, when the network manager 23 detects the end of the transaction process (Yes at Step S105), the performance manager 24 removes the process information immediately after application introduction from the process information during the transaction process to extract differential process information (Step S106).

Subsequently, the monitoring manager 25 extracts a process name from the extracted differential process information (Step S107), and generates configuration information of the IT system, with the process name and a server name associated with each other (Step S108). The monitoring manager 25 then outputs the generated configuration information to the monitoring server 30 (Step S109).

As explained above, according to the first embodiment, configuration information can be automatically generated to monitor the operating condition of the IT service. Also, according to the first embodiment, since configuration information can be automatically generated without a manual operation, a labor of generating configuration information can be saved. Furthermore, according to the first embodiment, since the system administrator is not required to generate configuration information, an error in generation of configuration information can be prevented.

[b] Second Embodiment

Figure 10:
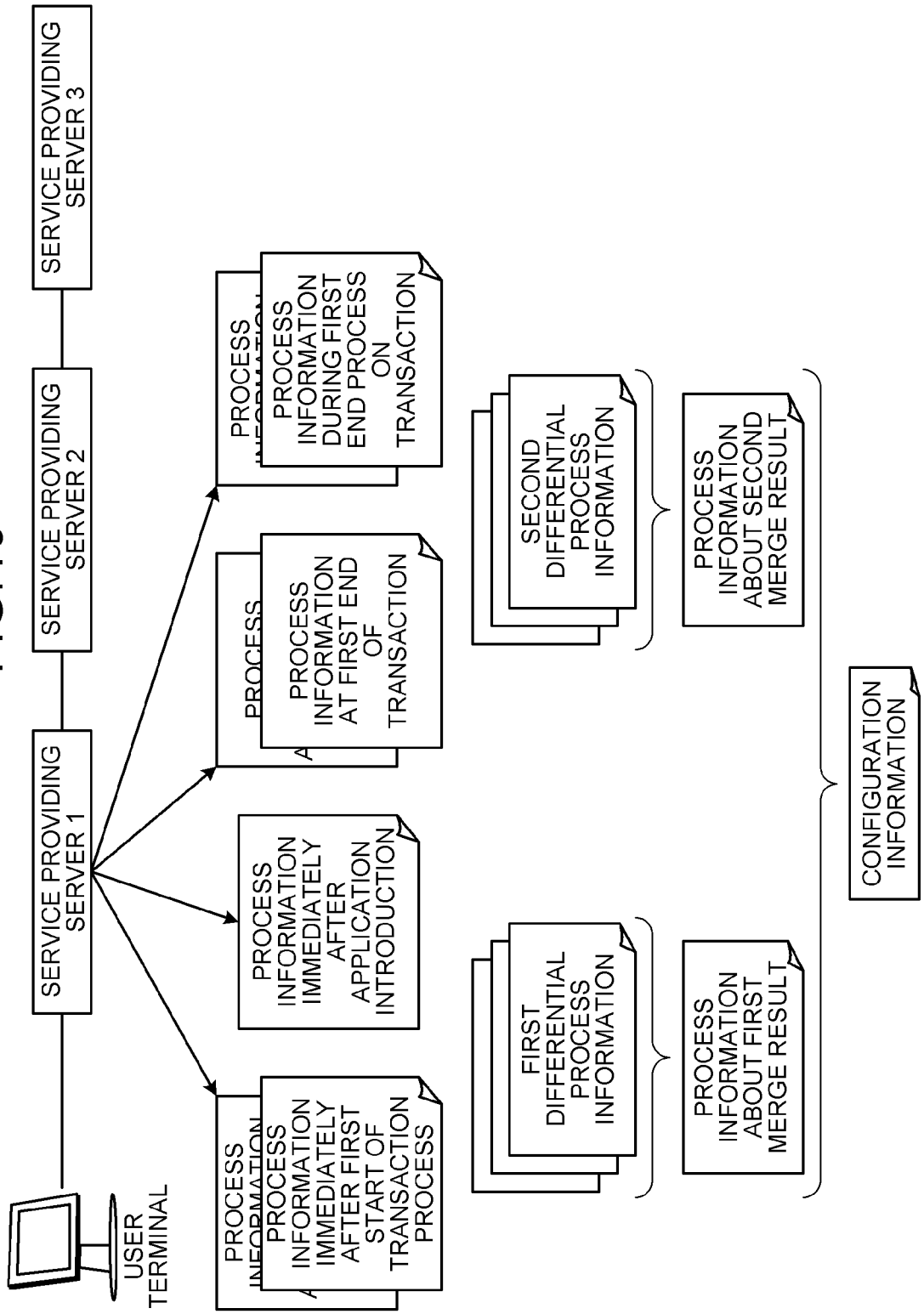
FIG. 10 is a diagram for explaining a general outline of a service monitoring system according to a second embodiment.

Meanwhile, in the first embodiment, the case is explained in which the process information collected after the transaction process is performed once is used to generate configuration information. By contrast, for example, as depicted in FIG. 10, the process information may be collected over a plurality of times of the transaction process, and such process information for the plural times may be used to generate configuration information.

[Configuration of the IT-Service Monitoring System]

Figure 11:
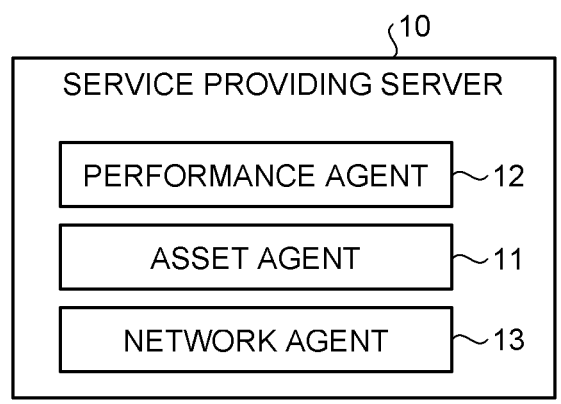
FIG. 11 is a block diagram of the configuration of a service providing server.

FIG. 11 is a block diagram of the configuration of a service providing server. The service providing server 10 includes, as depicted in FIG. 11, an asset agent 11 for collecting server information, a performance agent 12 for collecting process information, and a network agent 13 for collecting network information.

When an application for providing an IT service is introduced to any of the service providing servers 10, the asset agent 11 collects server information, and transmits the collected server information to the asset manager 22.

Upon accepting from the performance manager 24 a request for collecting process information immediately after application introduction, the performance agent 12 collects process information, and transmits the collected process information to the performance manager 24. Also, upon accepting from the network agent 13 a request for collecting process information immediately after the start of the transaction process, the performance agent 12 collects process information immediately after the start of the transaction process, and transmits the collected process information to the performance manager 24.

Also, between the start and end of the transaction process, whenever a preset time (for example, five seconds) elapses, the performance agent 12 collects process information, and transmits the collected process information to the performance manager 24. Furthermore, upon accepting from the network agent 13 a request for collecting process information at the end of the transaction, the performance agent 12 collects process information at the end of the transaction, and transmits the collected process information to the performance manager 24.

When the transaction process starts, the network agent 13 obtains transaction information indicative of a start timing of the transaction process (for example, the start time of the transaction process), and transmits the obtained transaction information to the network manager 23 of the configuration generating server 20. Subsequently, the network agent 13 requests the performance agent 12 to collect process information immediately after the start of the transaction process. At this time, the network agent 13 transmits an IT service type indicative of an IT service name to the network manager 23. The network agent 13 then collects network information immediately after the start of the transaction process, and transmits the collected network information to the network manager 23. Also, between the start and end of the transaction process, whenever a predetermined time elapses, the network agent 13 collects network information, and transmits the collected network information to the network manager 23.

Then, when the transaction process ends, the network agent 13 collects transaction information indicative of an end timing of the transaction process (for example, the end time of the transaction process), and transmits the collected transaction information to the network manager 23. Subsequently, the network agent 13 requests the performance agent 12 to collect process information at the end of the transaction. The network agent 13 then collects network information at the end of the transaction, and transmits the collected network information to the network manager 23.

Figure 12:
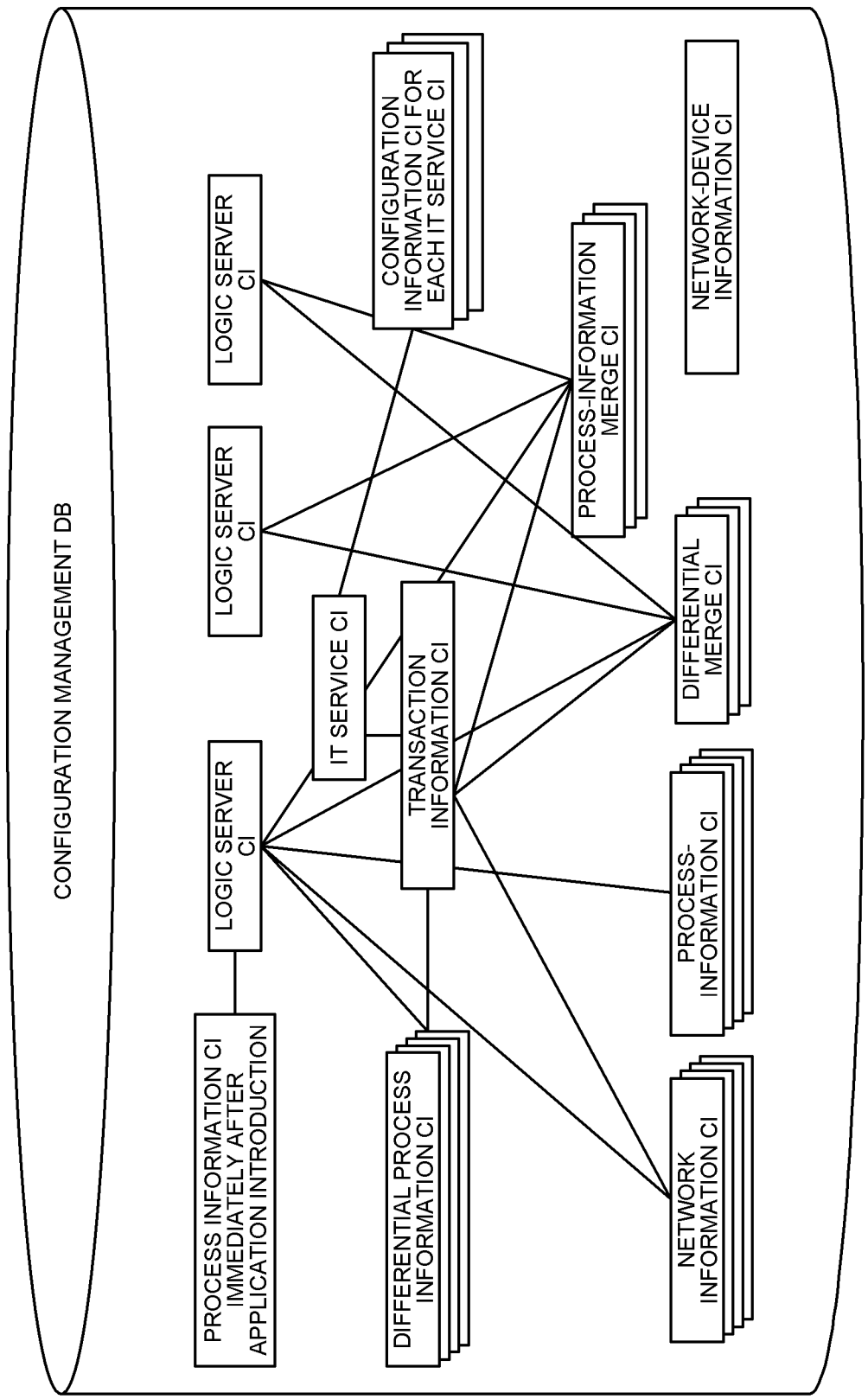
FIG. 12 is a diagram for explaining the configuration of a configuration management DB.
Figure 20:
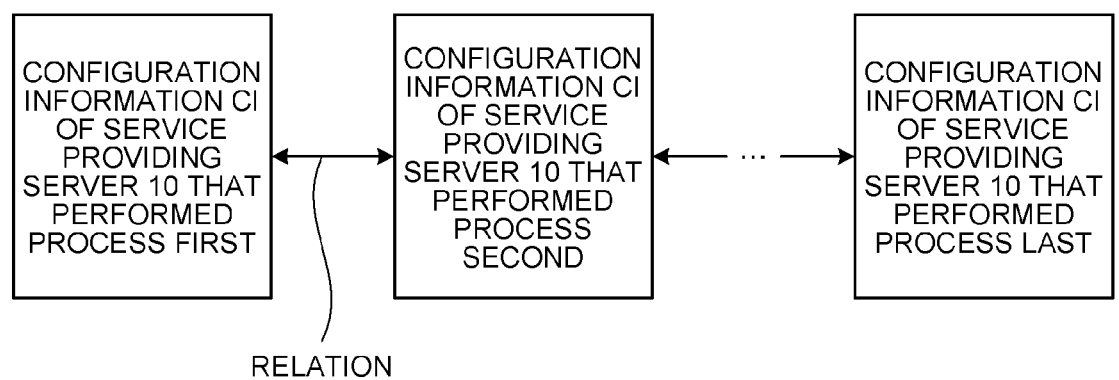

FIG. 12 is a diagram for explaining the configuration of a configuration management DB. As depicted in FIG. 12, the configuration management DB 21 is configured of information corresponding to each CI and relations among the CIs. Note in FIG. 12 that the information is partially omitted.

FIG. 13 is a diagram for explaining a process by the asset manager. Upon accepting server information from the service providing server 10, the asset manager 22 provides a CI-ID to the server information for storage as a logic server CI in the configuration management DB 21. Subsequently, the asset manager 22 collects information about network devices (for example, an IP address of the service providing server 10 as a load-distribution destination) from each load balancer. Then, as depicted in FIG. 13, the asset manager 22 provides a CI-ID to the information about the network devices for storage as network-device information CI in the configuration management DB 21.

FIGS. 14, 15, and 16 are diagrams for explaining a process by the network manager. Upon accepting transaction information from the network agent 13, as depicted in FIG. 14, the network manager 23 provides a CI-ID to the transaction information for storage as a transaction information CI (transaction start time) in the configuration management DB 21. The network manager 23 then associates the transaction information CI and the IT service CI with each other regarding the same IT service.

Here, when an IT service CI regarding the IT service whose transaction process has started is not stored in the configuration management DB 21, as depicted in FIG. 15, the network manager 23 uses the IT service type accepted from the network agent 13 to generate a new IT service CI. The network manager 23 then associates the transaction information CI and the IT service CI with each other.

Also, as depicted in FIG. 16, whenever accepting network information from the network agent 13, the network manager 23 provides a CI-ID to the network information for storage as a network information CI in the configuration management DB 21. The network manager 23 then associates the network information CI, the logic server CI, and the transaction information CI with each other, these CIs corresponding to the same service providing server 10.

Thereafter, upon accepting transaction information indicative of the end of the transaction process from the network agent 13, the network manager 23 updates the transaction information CI (transaction end time) stored in the configuration management DB 21.

Next, the configuration of the performance manager 24 is explained. Upon accepting a configuration generation command from the system administrator, the performance manager 24 transmits to the performance agent 12 of every service providing server 10 a request for collecting process information immediately after application introduction. Subsequently, upon accepting process information from the performance agent of each service providing server 10 as a response to the request for collecting process information immediately after application introduction, the performance manager 24 stores the process information as a process information CI immediately after application introduction in the configuration management DB 21. The performance manager 24 then associates the process information CI immediately after application introduction and the logic server CI with each other, these CIs corresponding to the same service providing server 10.

Also, upon accepting process information immediately after the start of a transaction process from the performance agent 12, the performance manager 24 provides a CI-ID to the process information immediately after the start of the transaction process for storage as one process information CI in the configuration management DB 21. Subsequently, the performance manager 24 reads, from the configuration management DB 21, the process information and the process information CI immediately after application introduction corresponding to the same service providing server 10 to extract differential process information. Next, the performance manager 24 provides a CI-ID to the extracted differential process information for storage as a differential process information CI in the configuration management DB 21. The performance manager 24 then associates the process information CI, the differential process information CI, the logic server CI, and the transaction CI with each other, these CIs corresponding to the same service providing server 10.

Furthermore, whenever accepting process information from the performance agent 12, the performance manager 24 provides a CI-ID to the accepted process information for storage as one process information CI in the configuration management DB 21. Then, as with the case of accepting process information immediately after the start of the transaction process, the performance manager 24 extracts differential process information for storage as a differential process information CI in the configuration management DB 21, and associates the logic server CI and the transaction CI with each other.

Subsequently, upon accepting process information at the end of the transaction from the performance agent 12, the performance manager 24 provides a CI-ID to the process information at the end of the transaction process for storage as one process information CI in the configuration management DB 21. Then, as with the case of accepting process information immediately after the start of the transaction process, the performance manager 24 extracts differential process information for storage as a differential process information CI in the configuration management DB 21, and associates the logic server CI and the transaction CI with each other.

FIGS. 17 to 20 are diagrams for explaining a process by a monitoring manager. When association of the network information CI by the network manager 23 at the end of the transaction is completed, the monitoring manager 25 merges differential process information corresponding to the same logic server CI, and stores the merge result as a differential merge CI for each server in the configuration management DB 21. Next, from among the service providing servers 10, the monitoring manager 25 specifies the service providing server 10 that performed the transaction process corresponding to the application first.

The monitoring manager 25 then specifies the service providing server 10 that performed the transaction process next by using the differential process information CI, the network-device information CI, and the network information CI associated with the logic server CI of the specified service providing server 10. Here, when the service providing server 10 that performed the transaction process next can be specified, the monitoring manager 25 generates a relation between the service providing servers 10.

Specifically, the monitoring manager 25 associates the differential process information CI associated with the logic server CI of the service providing server 10 that performed the process first and the differential process information CI associated with the logic server CI of the service providing server 10 that performed the process second with each other. The monitoring manager 25 then generates a relation object by associating the CI-IDs provided to the differential process information CIs associated with each other and, as depicted in FIG. 17, provides a CI-ID for storage as a relation object CI in the configuration management DB 21.

Note that an object-A ID in FIG. 17 corresponds to a CI-ID provided to the differential process information CI associated with the logic server CI of the service providing server 10 that performed the process first. Also, an object-B ID in FIG. 17 corresponds to a CI-ID provided to the differential process information CI associated with the logic server CI of the service providing server 10 that performed the process second.

Thereafter, the monitoring manager 25 specifies the service providing servers 10 in the order of performing the transaction until any service providing server 10 that performed the transaction process can no longer be specified, thereby generating relations among the service providing servers 10. Then, when becoming unable to specify any service providing server 10, in other words, specifying the service providing server 10 that performed the transaction process corresponding to the application last, the monitoring manager 25 determines whether the configuration information has already been present.

When determined that the configuration information has already been present, the monitoring manager 25 reads, for each service providing server 10, the differential process information associated with the logic server CI of the service providing server 10 from the configuration management DB 21. Subsequently, the monitoring manager 25 lists the process names included in the differential process information for storage as a process-information merge CI in the configuration management DB 21 as depicted in FIG. 18. Subsequently, the monitoring manager 25 determines whether all process names listed in the existing configuration information are listed in the process-information merge CI.

When determining that not all are listed, the monitoring manager 25 notifies the monitoring server 30 of a process name not listed in the process-information merger CI to notify that the existing configuration information is incorrect. On the other hand, when determining that they are all listed, the monitoring manager 25 determines that the existing configuration information is correct, and notifies the monitoring server 30 of the determination result indicative of a normal operation.

The monitoring manager 25 then generates configuration information. Specifically, the monitoring manager 25 determines the number of times of integration in an integration result CI (refer to FIG. 19) has already reached a defined number of times set in advance (for example, hundred times). When determining that the number of times has not yet reached the defined number of times, the monitoring manager 25 increments the number of times of integration in the integration-result CI by 1. Subsequently, the monitoring manager 25 reads a process name in the differential process information from the configuration management DB 21, and increments the number of times of occurrence of the process name in the integration-result CI matching the read process name by 1.

Subsequently, the monitoring manager 25 divides the number of times of occurrence by the number of times of integration for each process name in the integration-result CI to calculate a probability of occurrence. Subsequently, the monitoring manager 25 lists process names with their probability of occurrence equal to or greater than a threshold set in advance to generate configuration information for each service providing server 10, provides a CI-ID to the configuration information for each service providing server 10 for storage as a configuration information CI for each service providing server in the configuration management DB 21. Next, with reference to a relation object CI, a relation among the configuration information CIs is generated for each service providing server 10, thereby generating configuration information for use in IT-service monitoring (refer to FIG. 20).

The monitoring manager 25 then outputs the generated configuration information to the monitoring server 30. Thereafter, the monitoring manager 25 deletes the process information CI, differential process information CI, relation object CI, and configuration information CI for each service providing server 10 stored in the configuration management DB 21.

[Process of the IT-Service Monitoring System]

FIGS. 21 to 26 are flowcharts of a process flow of the IT-service monitoring system. In the following, a process by the service providing servers 10 and the configuration generating server 20 from the time when an application is introduced to any of the service providing servers by the system administrator until configuration information is generated by the IT-service monitoring system is explained.

Figure 21:
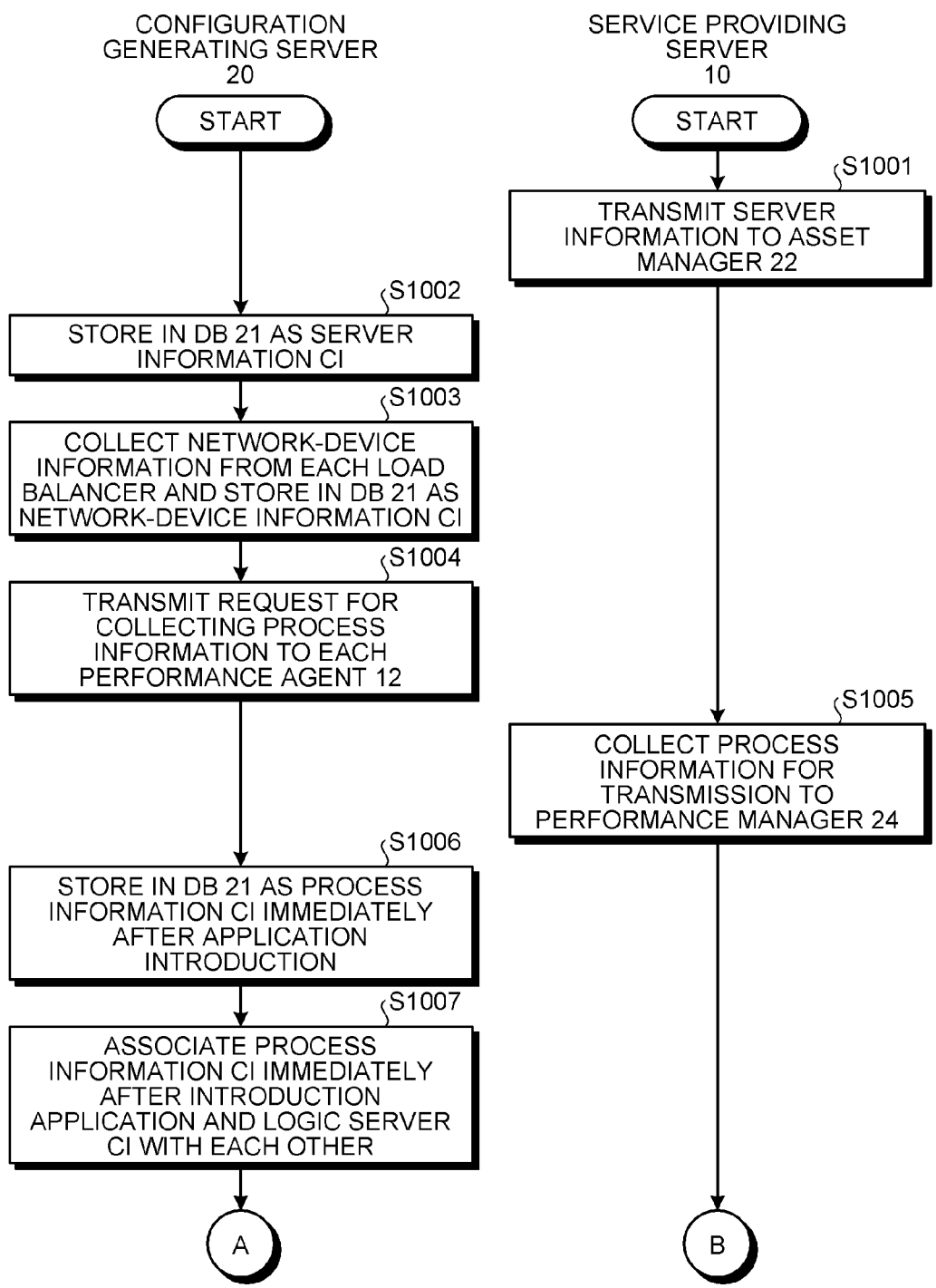
FIGS. 21 to 26 are flowcharts of a process flow of an IT-service monitoring system.

As depicted in FIG. 21, when an application is introduced to any of the service providing servers 10, the asset agent 11 of each service providing server 10 collects server information for transmission to the asset manager 22 (Step S1001). The asset manager 22 accepting the server information from the service providing server 10 provides a CI-ID to the server information for storage as a logic server CI in the configuration management DB 21 (Step S1002).

Subsequently, the asset manager 22 collects information about network devices from each load balancer, provides a CI-ID to the information about network devices for storage as network-device information CI in the configuration management DB 21 (Step S1003). Here, upon accepting a configuration generation command from the system administrator, the performance manager 24 transmits a request for collecting process information immediately after application introduction to the performance agent 12 of every service providing server 10 (Step S1004).

The performance agent 12 accepting the request for collecting process information immediately after application introduction collects such process information as a response, and then transmits the collected process information to the performance manager 24 (Step S1005). Upon receiving the process information, the performance manager 24 stores the process information as a process information CI immediately after application introduction in the configuration management DB 21 (Step S1006). Subsequently, the performance agent 12 associates the process information CI immediately after application introduction and the logic server CI with each other, these CIs corresponding to the same service providing server 10 (Step S1007).

Figure 22:
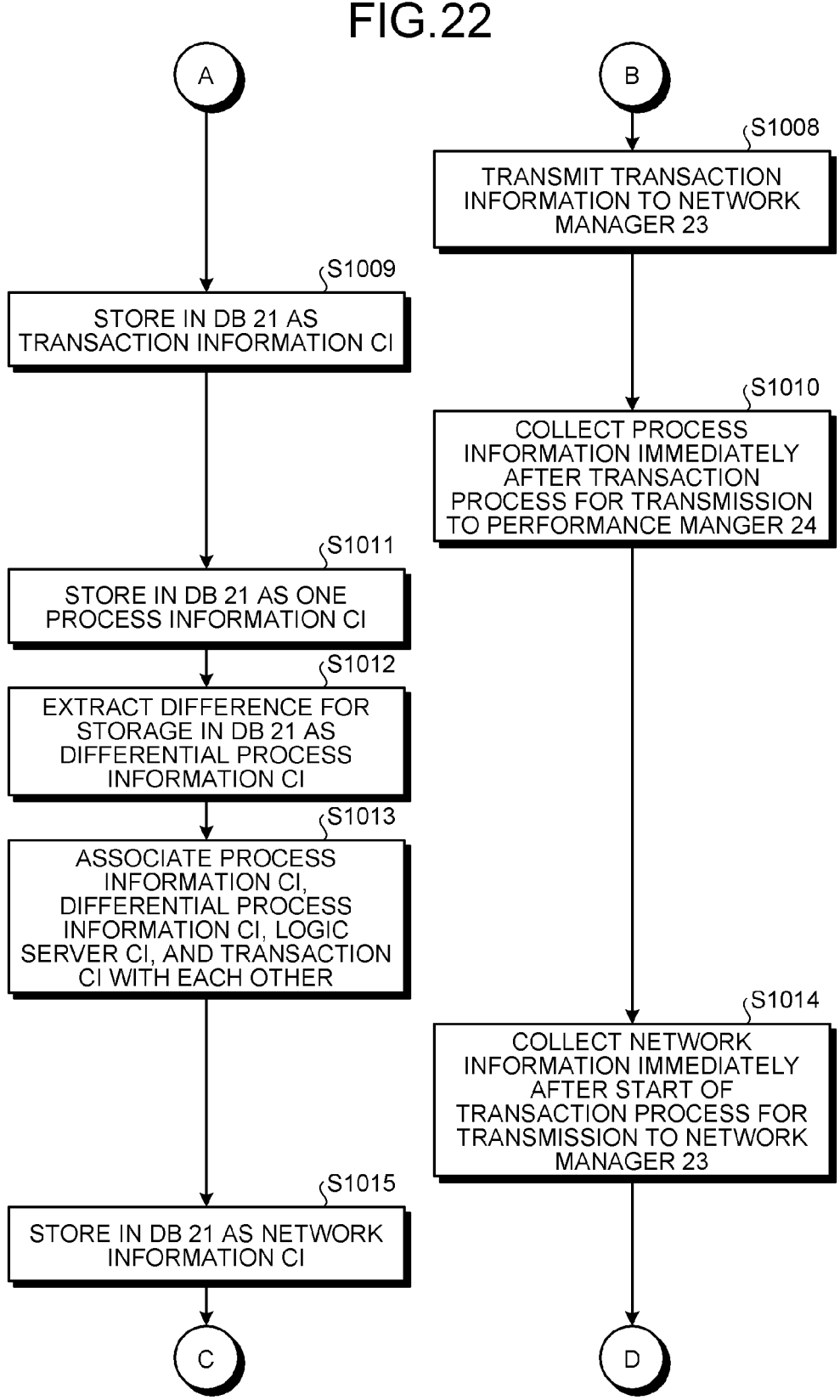

Thereafter, when a transaction process starts, as depicted in FIG. 22, the network agent 13 obtains transaction information for transmission to the network manager 23 (Step S1008).

The network manager 23 accepting the transaction information provides a CI-ID to the transaction information, stores as a transaction information CI in the configuration management DB 21, and associates the transaction information CI and an IT-service CI with each other (Step S1009).

Then, the performance agent accepting from the network agent 13 a request for collecting process information immediately after the start of the transaction process collects the process information immediately after the start of the transaction process, and transmits the collected process information to the performance manager 24 (Step S1010). The performance manager 24 accepting the process information immediately after the start of the transaction process provides a CI-ID to the process information immediately after the start of the transaction process, and stores as one process information CI in the configuration management DB 21 (Step S1011).

Subsequently, the performance manager 24 extracts a difference between the process information and the process information corresponding to the process information CI immediately after application introduction corresponding to the same service providing server 10, and stores as a differential process information CI in the configuration management DB 21 (Step S1012). The performance manager 24 then associates the process information CI, the differential process information CI, the logic server CI, and a transaction CI with each other, these CIs corresponding to the same service providing server 10 (Step S1013). The network agent 13 then collects network information immediately after the start of the transaction process for transmission to the network manager 23 (Step S1014). The network manager 23 accepting the network information immediately after the start of the transaction process provides a CI-ID to the network information, stores as a network information CI in the configuration management DB 21, and associates the network information CI, the logic server CI, and the transaction information CI with each other (Step S1015).

Figure 23:
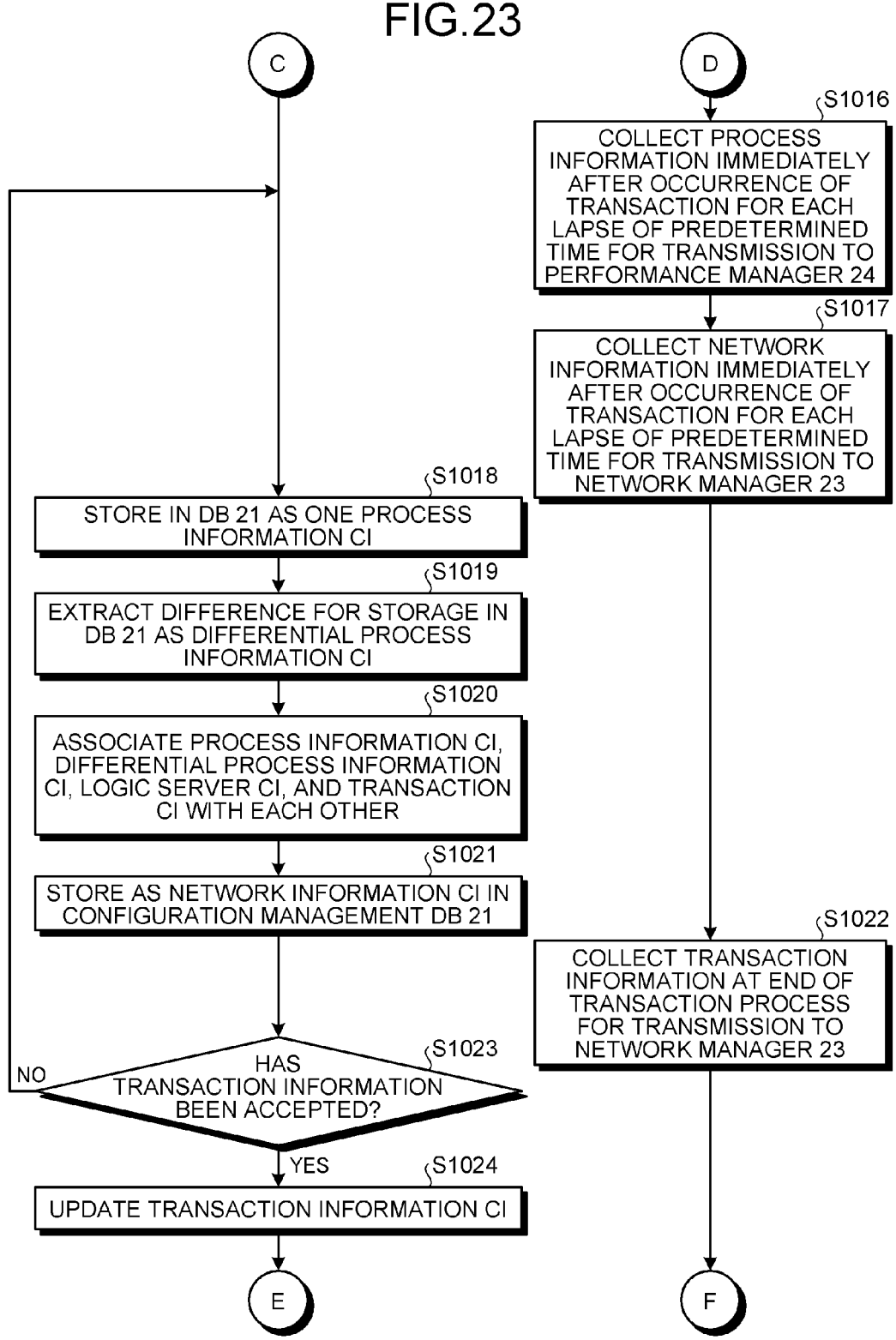

Thereafter, as depicted in FIG. 23, whenever a predetermined time elapses, the performance agent 12 transmits the process information to the performance manager 24 (Step S1016), and the network agent 13 transmits the network information to the network manager 23 (Step S1017). Then, whenever accepting the process information, the performance manager 24 stores a process information CI (Step S1018), stores a differential process information CI (Step S1019), and establishes association (Step S1020). Also, whenever accepting the network information, the network manager 23 stores a network information CI in the configuration management DB 21, and establishes association (Step S1021).

Thereafter, when the transaction process ends, the network manager 23 collects transaction information indicative of the end of the transaction process for transmission to the network manager 23 (Step S1022). Upon accepting the transaction information (Yes at Step S1023), the network manager 23 updates the transaction information CI stored in the configuration management DB 21 (Step S1024).

Figure 24:
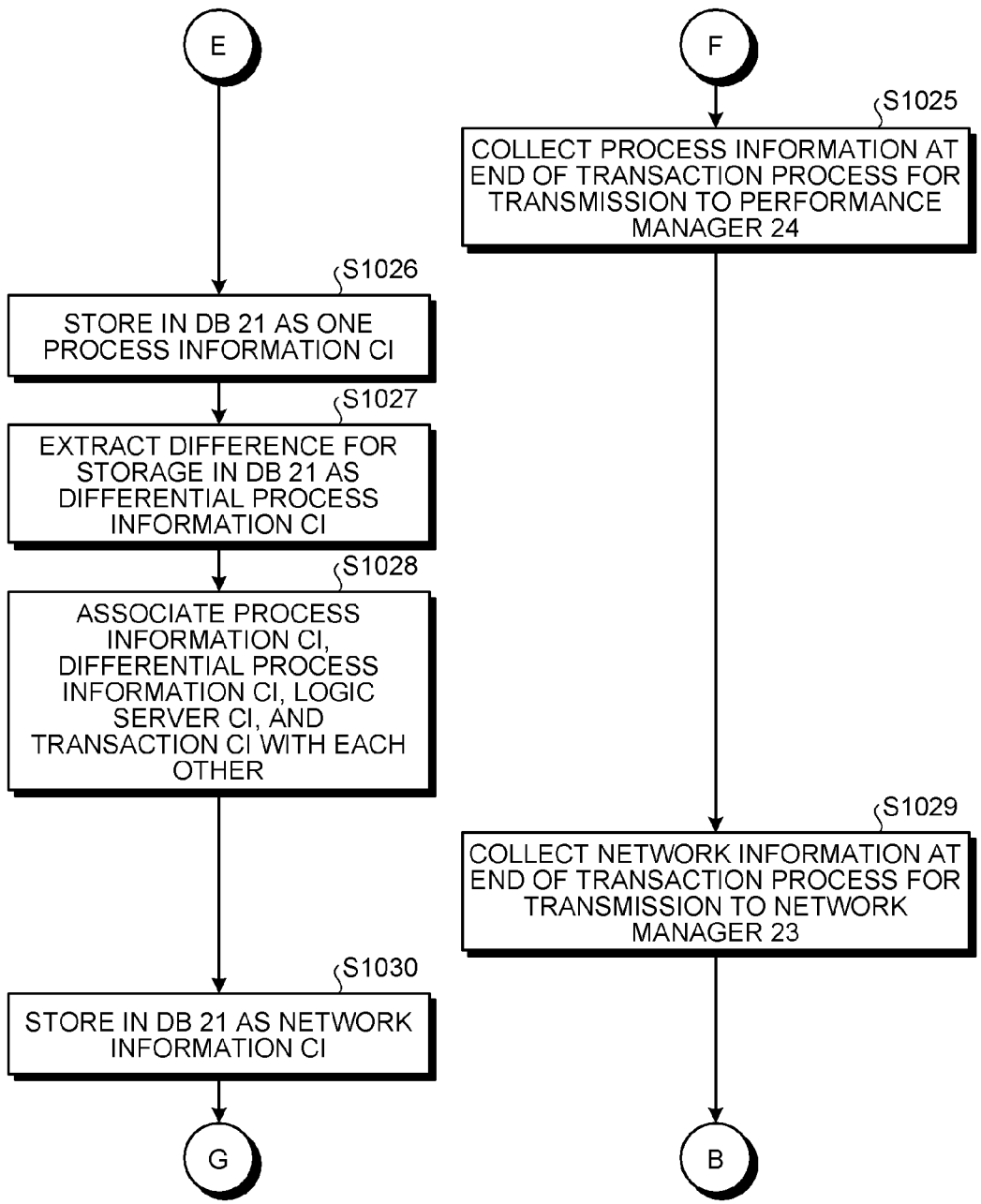

Then, as depicted in FIG. 24, the performance agent 12 accepting from the network agent 13 a request for collecting process information at the end of the transaction process collects process information at the end of the transaction process for transmission to the performance manager 24 (Step S1025). The performance manager 24 accepting the process information at the end of the transaction process provides a CI-ID to the process information at the end of the transaction process for storage as one process information CI (Step S1026). The performance manager 24 then collects a difference, stores a differential process information CI (Step S1027), and establishes association (Step S1028).

Subsequently, the network agent 13 collects network information at the end of the transaction for transmission to the network manager 23 (Step S1029), waiting for the start of the transaction process. The network agent 13 accepting the network information at the end of the transaction stores a network information CI in the configuration management DB 21, and establishes association (Step S1030).

Figure 25:
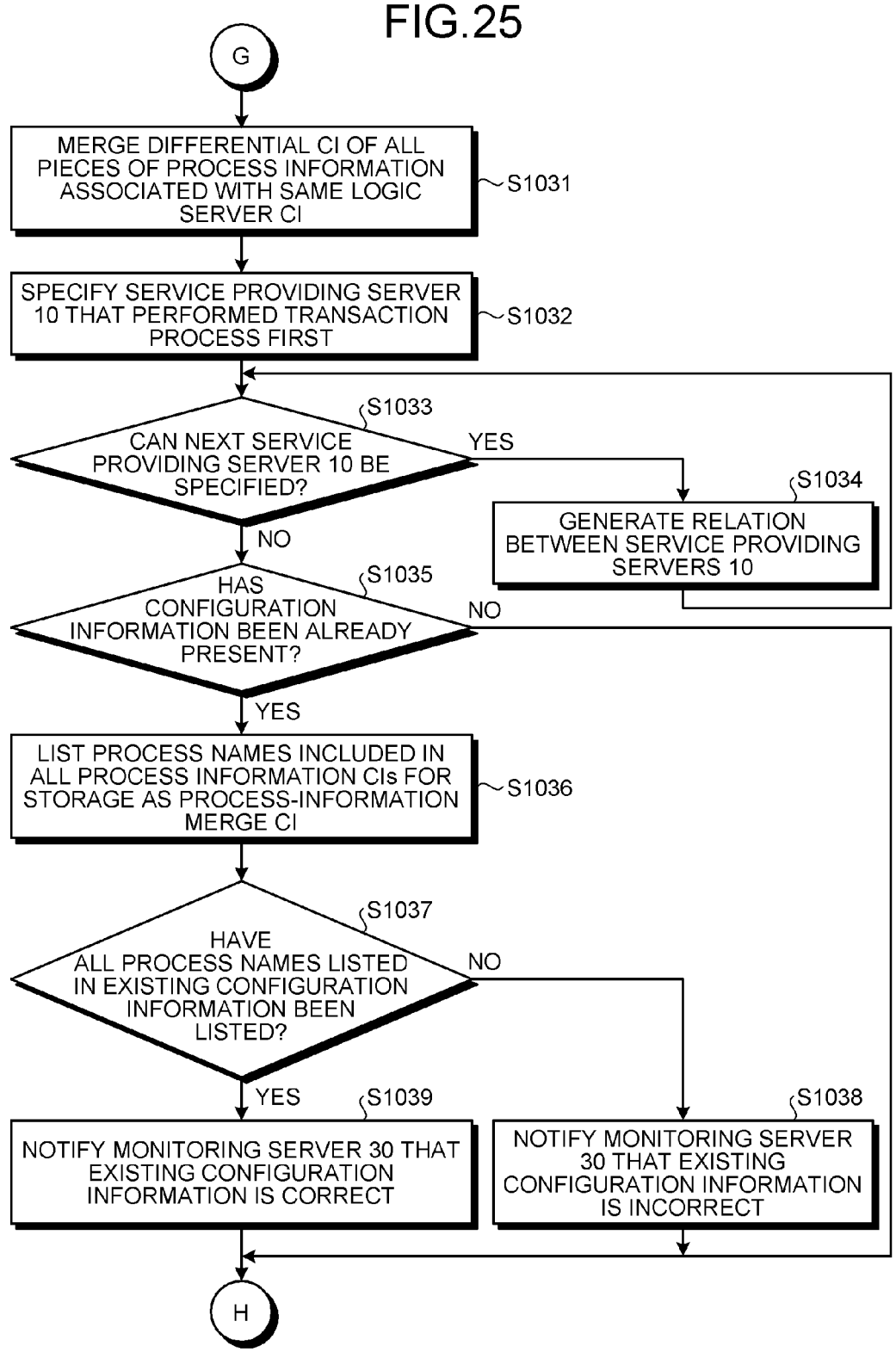

Subsequently, as depicted in FIG. 25, the monitoring manager 25 merges all pieces of process information associated with the same logic server CI and the transaction CI together, and stores the merge result as a differential merge CI for each server in the configuration management DB 21 (Step S1031). Furthermore, the monitoring manager 25 specifies the service providing server 10 that performed the transaction process first (Step S1032), and then tries to specify the service providing server 10 that performed the transaction process second (Step S1033). Here, when such the service providing server 10 that performed the transaction process second can be specified (Yes at Step S1033), a relation between the service providing servers 10 is generated (Step S1034).

The monitoring manager 25 then generates a relation among the service providing servers 10 until any service providing server that performs the transaction process cannot be specified. When any service providing server that performs the transaction process cannot be specified (No at Step S1033), the monitoring manager 25 determines whether the configuration information has already been present (Step S1035). When determining that the configuration information has already been present (Yes at Step S1035), the monitoring manager 25 lists the process names included in the differential process information for storage as a process-information merge CI in the configuration management DB 21 (Step S1036).

Subsequently, the monitoring manager 25 determines whether all process names listed in the existing configuration information are listed in the process-information merge CI (Step S1037). When determining that not all process names are listed (No at Step S1037), the monitoring manager 25 notifies that the existing configuration information is incorrect (Step S1038). On the other hand, when determining that all are listed (Yes at Step S1037), the monitoring manager 25 determines that the IT service is operating correctly, and notifies the monitoring server 30 that the existing configuration information is correct (Step S1039).

Figure 26:
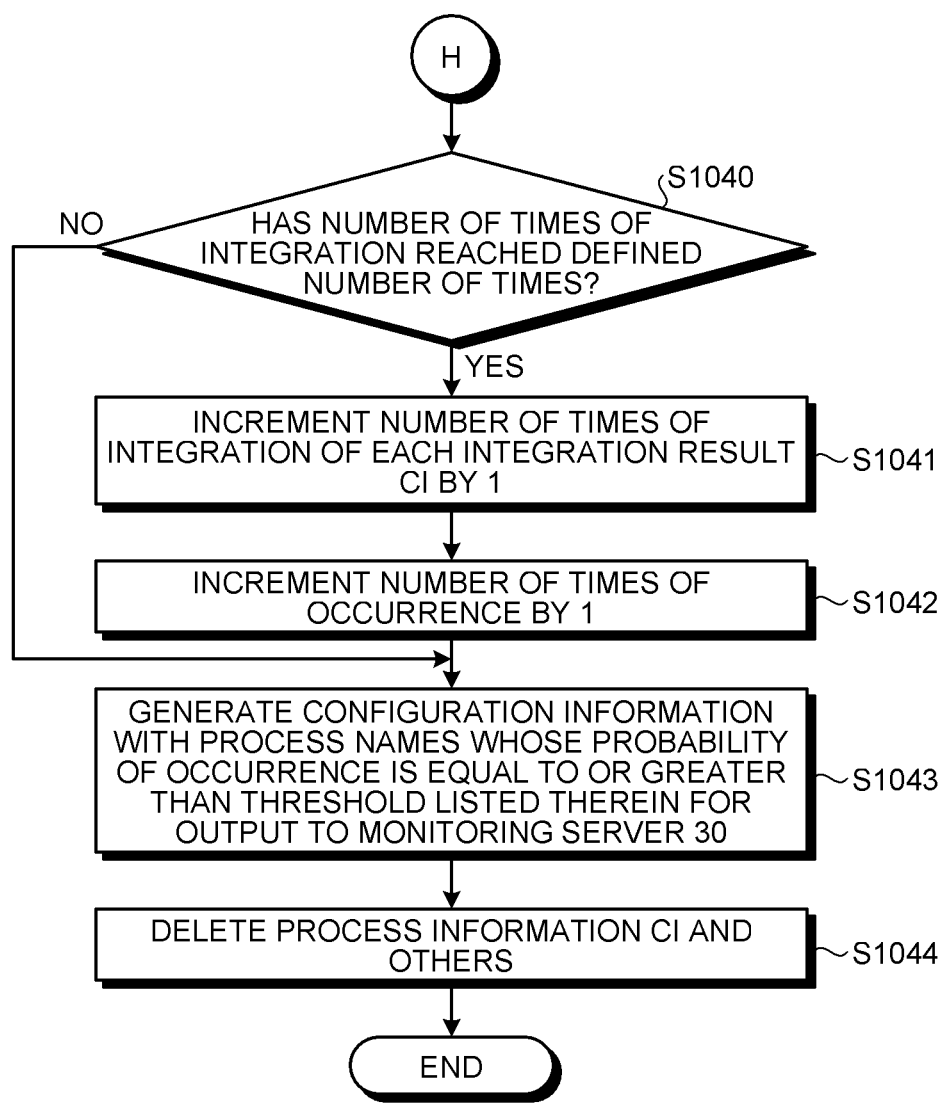

Thereafter, as depicted in FIG. 26, the monitoring manager 25 determines whether the number of times of integration in the integration result CI has reached a defined number of times set in advance (Step S1040). When determining that the number has reached the defined number of times (Yes at Step S1040), the monitoring manager 25 increments the number of times of integration in the integration-result CI by 1, reads a process name in the differential process information, and increments the number of times of occurrence of the read process name by 1 (Step S1042).

Then, the monitoring manager 25 generates configuration information with process names with their probability of occurrence equal to or greater than a threshold set in advance listed therein, and outputs the generated configuration information to the monitoring server 30 (Step S1043). Subsequently, the monitoring manager 25 deletes the process information CI, the differential process information CI, the relation object CI, and the configuration information CI for each service providing server 10 (Step S1044), and the configuration generating server 20 ends the process. Note that the transaction CI and the process-information merger CI are deleted after the number of days set in advance (for example, one day) elapses.

As explained above, according to the second embodiment, more accurate configuration information can be generated. For example, according to the second embodiment, it is possible to prevent the situation in which the process name of a process that happened to start operating during a transaction process is listed in the configuration information.

[c] Other Embodiments

Other embodiments of the configuration-information generating program, configuration-information generating apparatus, configuration-information generating method, and monitoring program are explained below.

For example, in the first embodiment, the case is explained in which the configuration information is generated from the differential process information between the process information immediately after the application is introduced and the process information during the transaction process. Alternatively, process information may be collected before the transaction process, and the configuration information may be generated from differential process information between the collected process information and the process information during the transaction process.

Also, the configuration generating server 20 and the monitoring server 30 may output and display the configuration information via a display device connected to each server so that the system administrator can check the generated configuration information.

Also, the process procedure, the control procedure, specific names, and information including various data and parameters (for example, storage information depicted in FIG. 4 and others) explained in the specification and depicted in the drawings can be arbitrarily changed unless otherwise specified.

Furthermore, the connecting relation among the servers and each component of each server depicted in FIGS. 2, 3, and 11 are conceptual in function, and are not necessarily physically configured as depicted. That is, the specific patterns of distribution and unification of the components are not meant to be restricted to those depicted in the drawings. All or part of the components can be functionally or physically distributed or unified in arbitrary units according to various loads and use conditions. For example, the asset manager 22 and the performance manager 24 depicted in FIG. 3 can be configured as being unified together.

Still further, all or arbitrary part of the process functions performed in each component can be achieved by a Central Processing Unit (CPU) and a program analyzed and executed on that CPU, or can be achieved as hardware with a wired logic.

Figure 27:
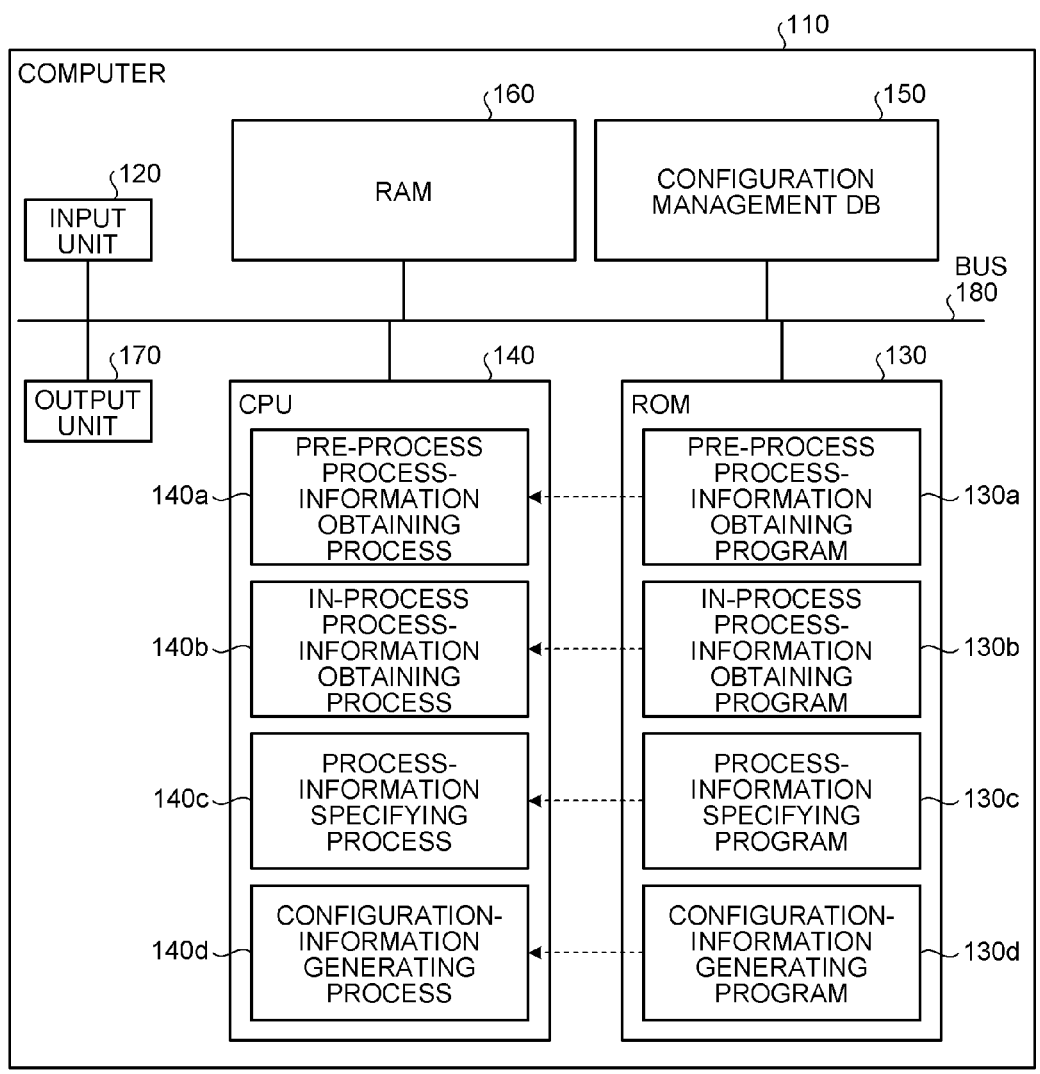
FIG. 27 is a computer that executes a configuration generating program.

Meanwhile, the present invention may be achieved by a computer as the configuration generating server 20 executing a program provided in advance. Thus, in the following, a computer that executes a configuration generating program having functions similar to those of the configuration generating server 20 depicted in the embodiments above is explained by way of example by using FIG. 27. FIG. 27 is such a computer that executes a configuration generating program.

As depicted in FIG. 27, a computer 110 as the configuration generating server 20 includes an input unit 120, a Read-Only Memory (ROM) 130, a CPU 140, a configuration management DB 150, a Random Access Memory (RAM) 160, and an output unit 170, all of which are connected via a bus 180.

The ROM 130 has stored therein in advance a configuration generating program achieving functions similar to those of the configuration generating server 20 explained in the first embodiment, that is, a pre-process process-information obtaining program 130*a*, an in-process process-information obtaining program 130*b*, a process-information specifying program 130*c*, and a configuration-information generating program 130*d* as depicted in FIG. 27. Note that these programs 130*a* to 130*d* may be unified or distributed as appropriate.

With the CPU 140 reading these programs 130*a* to 130*d* from the ROM 130 for execution, as depicted in FIG. 27, the programs 130*a* to 130*d* function as a pre-process process-information obtaining process 140*a*, an in-process process-information obtaining process 140*b*, a process-information specifying process 140*c*, and a configuration-information generating process 140*d*. Note that the pre-process process-information obtaining process 140*a* and the in-process process-information obtaining process 140*b* correspond to the performance manager 24, whilst the process-information specifying process 140*c* and the configuration-information generating process 140*d* correspond to the monitoring manager 25. Also, the CPU 140 performs processes based on various CIs read from the configuration management DB 150 and stored in the RAM 160.

Here, the programs 130*a* to 130*d* mentioned above are not necessarily stored in the ROM 130 from the start. For example, each program may be stored in a "portable physical medium" inserted in the computer 110, such as a flexible disk (FD), compact-disk read only memory (CD-ROM), digital versatile disk (DVD), magneto-optical disk, or Integrated Circuit (IC) card; a "fixed physical medium" inside or outside of the computer 110, such as a hard disk drive (HDD); or further "another computer (or server)" connected to the computer 110 via a public line, the Internet, a Local Area Network (LAN), or a Wide Area Network (WAN), and be read by the computer 110 therefrom for execution.

Here, with the configuration generating server 20 explained in the first embodiment, the following configuration generating method is achieved. That is, the configuration generating method is achieved including: a pre-process process-information obtaining step (corresponding to Step S102 in FIG. 9) of obtaining, from each server configuring an IT system, process information about a process operating on the server before a series of processes including a process corresponding to an application for providing an IT service is started in any of the servers; an in-process process-information obtaining step of obtaining the process information from each of a plurality of servers over a plurality of number of times from start to end of performing the series of processes including the process corresponding to the application (corresponding to Step S104 in FIG. 9); a process-information specifying step (corresponding to Step S106 in FIG. 9) of removing, from out of the process information obtained at the in-process process-information obtaining step, process information corresponding to the process information obtained at the pre-process process-information obtaining step, and specifying process information while the series of processes including the process corresponding to the application is being performed; and a configuration-information generating step (corresponding to Steps S107 and S108 in FIG. 9) of generating configuration information for monitoring a process condition of the series of processes including the process corresponding to the application by extracting, from the process information specified at the process-information specifying step, a process name corresponding to the application and identification information of a server where the process corresponding to the application is performed and associating the extracted process name with identification information together.

According to an embodiment, configuration information required for monitoring the operating condition of the IT service can be automatically generated. Also, according to an embodiment, the operating condition of the IT service can be automatically monitored by using the configuration information generated through the configuration-information generating program or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory medium containing instructions that cause a computer to execute a process, the process comprising:
    first obtaining first process information of a process operating on a server from each of a plurality of servers constituting an IT system prior to a start of a series of processes in any of the servers, the series of processes including a process corresponding to an application for providing an IT service;
    repeatedly second obtaining second process information of a process from each of the servers through the start to end of the process performing the application;
    specifying third process information of processes corresponding to the application by removing the first process information from the second process information;
    automatically generating configuration information for monitoring a process condition of a series of processes including the process corresponding to the application by extracting, from the third process information, a process name corresponding to the application and identification information of the server where the process corresponds to the process name of the application, the extracted process name being associated with the identification information; and
    monitoring the process corresponding to the application by using the configuration information.

2. The computer-readable, non-transitory medium according to claim 1, wherein
    the generating includes extracting a process name corresponding to a new application for each of the pieces of identification information of the servers, generating a plurality of pieces of configuration information corresponding to respective pieces of identification information of the servers, and generating configuration information with a plurality of pieces of configuration information being brought together, when process information including pieces of identification information of a plurality of the servers is specified in the specifying third process information.

3. The computer-readable, non-transitory medium according to claim 1, wherein
    the second obtaining obtains the second process information every time when the application is performed,
    wherein the instructions further cause the computer to perform counting a number of times for obtaining the second process information in the second obtaining, wherein the generating includes generating the configuration information by counting a number of times for obtaining each process name in the application from the second process information, dividing the number of times for obtaining the second process information by the number of times for obtaining the process name to calculate a probability of occurrence, and extracting the process name whose probability of occurrence is more than a preset threshold.

4. A configuration-information generating apparatus, comprising:
   a processor; and
   a memory storing computer-readable instructions, execution of the instructions by the processor facilitates generating configuration-information, execution of the instructions by the processor configuring the apparatus to include;
   a pre-process process-information obtaining unit that obtains first process information of a process operating on a server from each of a plurality of servers constituting an IT system, prior to a start of a series of processes in any of the servers, the series of processes including a process corresponding to an application for providing an IT service;
   an in-process process-information obtaining unit that repeatedly obtains second process information of a process from each of the servers through the start to end of the process performing to the application;
   a process-information specifying unit that specifies third process information of processes corresponding to the application, by removing the first process information from the second process information;
   a configuration-information generating unit that automatically generates configuration information for monitoring a process condition of a series of processes including the process corresponding to the application by extracting, from the third process information, a process name corresponding to the application and identification information of the server where the process corresponds to the process name of the application, the extracted process name being associated with the identification information; and
   a monitoring unit that monitors the process corresponding to the application by using the configuration information.

5. A configuration-information generating method, comprising:
   first obtaining first process information of a process operating on a server from each of a plurality of servers constituting an IT system prior to a start of a series of processes in any of the servers, the series of processes including a process corresponding to an application for providing an IT service;
   repeatedly second obtaining second process information of a process from each of the servers through the start to end of the process performing the application;
   specifying third process information of processes corresponding to the application by removing the first process information from the second process information;
   automatically generating configuration information for monitoring a process condition of a series of processes including the process corresponding to the application by extracting, from the third process information, a process name corresponding to the application and identification information of the server where the process corresponds to the process name of the application, the extracted process name being associated with the identification information; and
   monitoring the process corresponding to the application by using the configuration information.

6. A computer-readable, non-transitory medium storing a program that causes a computer to execute a procedure, the procedure comprising:
   obtaining a first identifier group of one or more identifiers each of which identifies a process executed prior to start of a certain application;
   obtaining a second identifier group of one or more identifiers each of which identifies a process executed between the start and end of the certain application; and
   automatically generating configuration information regarding the certain application based on one or more identifiers each of which is not included in the first identifier group but included in the second identifier group; and
   monitoring the process corresponding to the application by using the configuration information.

\* \* \* \* \*